United States Patent
Lee et al.

[11] Patent Number: 6,032,105
[45] Date of Patent: *Feb. 29, 2000

[54] COMPUTER-IMPLEMENTED MICROCELL PREDICTION MODELING WITH TERRAIN ENHANCEMENT

[75] Inventors: William Chien-Yeh Lee, Danville; Jau Young Lee, Walnut Creek, both of Calif.

[73] Assignee: AirTouch Communications, Inc., San Francisco, Calif.

[ * ] Notice: This patent is subject to a terminal disclaimer.

[21] Appl. No.: 08/904,410

[22] Filed: Jul. 31, 1997

[51] Int. Cl.$^7$ ............................................. H04B 7/00
[52] U.S. Cl. ............................ 702/57; 702/74; 702/75; 455/62; 455/67.1
[58] Field of Search .................. 702/57, 74–75; 364/192; 455/436, 446, 562; 457/62, 67.1, 134, 226.2

[56] References Cited

U.S. PATENT DOCUMENTS

| | | |
|---|---|---|
| 3,806,809 | 4/1974 | Firman . |
| 4,317,214 | 2/1982 | Attinello . |
| 4,435,840 | 3/1984 | Kojima et al. ................... 455/443 |
| 4,549,311 | 10/1985 | McLaughlin ................... 455/62 |
| 4,613,990 | 9/1986 | Halpern ................... 455/522 |
| 4,679,248 | 7/1987 | McKeown . |
| 4,704,734 | 11/1987 | Menich et al. ................... 455/562 |
| 4,868,771 | 9/1989 | Quick et al. ................... 364/578 |
| 5,019,961 | 5/1991 | Addesso et al. ................... 364/192 |
| 5,144,642 | 9/1992 | Weinberg et al. . |
| 5,193,109 | 3/1993 | Chien-yeh Lee ................... 455/436 |

OTHER PUBLICATIONS

Aboulgasem et al., 39$^{th}$ IEEE, Vehicular Technology Conference, volume II, pp. 823–830, 1989.

Buhler et al., PICAM: A PC Based Cellular Network Planning Software Package, IEEE, pp. 643–646, 1991.

Lee, William C.Y., "Mobile Cellular Telecommunications: Analog and Digital Systems,"McGraw–Hill, Inc., 1995 (9 pages).

*Primary Examiner*—Marc S. Hoff
*Assistant Examiner*—Bryan Bui
*Attorney, Agent, or Firm*—Gates & Cooper

[57] ABSTRACT

A computer-implemented modeling tool for cellular telephone systems predicts signal strength under real conditions by considering the effects of terrain and man-made structures on transmitted signals. The modeling tool gives more accurate predictions under line of sight conditions, when obstructions occur due to terrain contours, and when mobile or transmitter antennas are blocked by buildings or other structures.

15 Claims, 11 Drawing Sheets

COMPUTER-IMPLEMENTED MICROCELL PREDICTION MODELING WITH TERRAIN ENHANCEMENT

CROSS REFERENCE TO RELATED APPLICATIONS

This application is related to U.S. patent application Ser. No. 08/904,309, filed on same date herewith, by William C. Y. Lee, et al., and entitled "COMPUTER-IMPLEMENTED INBUILDING PREDICTION MODELING FOR CELLULAR TELEPHONE SYSTEMS," which application is incorporated by reference herein.

BACKGROUND OF THE INVENTION

1. Field of the Invention

The present invention relates to a computer-implemented system for the design and development of wireless communication systems. In particular, the present invention discloses a modeling system integrated with a comprehensive set of software tools for the design, development and management of cellular telephone networks.

2. Description of Related Art

The capacity of cellular telephone systems in urban areas is typically their most precious commodity. The use of smaller cells, called "microcells," has been one of the solutions used to increase the capacity of the cellular telephone systems.

Because capacity is such a precious commodity, the design and management decisions made for cellular telephone systems are usually made to maximize the capacity of the system. For example, engineers must design the system to maximize the coverage of the geographic area with the minimum number of cell sites. In addition, interference problems must be studied so that their effect is minimized. Further, the blocking probability of each cell site must be analyzed to ensure proper call initiation.

The design of a cellular telephone system is usually performed by using modeling techniques before the system is placed in actual usage. The Lee model, described in "Mobile Cellular Telecommunications," by William C. Y. Lee, Second Edition, 1995, which is hereby incorporated by reference, is the standard model for designing a cellular telephone system. The models and the investigations performed in this area concentrate on analyzing the propagation of electromagnetic waves under a line of sight analysis.

The reflections or blocking of a direct line of sight transmission due to local terrain or man-made structures such as buildings are typically ignored during the modeling process. Ignoring the buildings and terrain effects on the transmission of radio frequency (RF) signals was assumed to be proper since cells are small. However, microcell antennas, once placed in operation, need to be adjusted in terms of placement, power output, and antenna beam patterns because the models used do not accurately predict the conditions experienced in actual use of the cellular system.

It can be seen, then, that there is a need for a better modeling tool to more accurately predict conditions present in the operation of cellular telephone systems.

SUMMARY OF THE INVENTION

To minimize the limitations in the prior art described above, and to minimize other limitations that will become apparent upon reading and understanding the present specification, the present invention discloses a method, apparatus, and article of manufacture for modeling cellular telephone systems to predict signal strength under real conditions, by considering the effects of terrain and man-made structures on transmitted signals. The present invention gives more accurate predictions under line of sight conditions, when obstructions occur due to terrain contours, and when mobile or transmitter antennas are blocked by buildings or other structures.

One object of the present invention is to solve the above-described problems by using models of the terrain and buildings to more accurately predict the conditions that the cellular system will be used under. Another object of the present invention is to increase cellular system capacity. It is a further object of the present invention to more accurately model a cellular system. It is a further object of the present invention to reduce the costs of implementing a cellular system.

For a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention is computer-implemented modeling tool that accurately determines the signal strength from a transmitter to a receiver located at a distant point. The modeling tool uses line of sight calculations to determine the signal strength, as well as determining the effects of terrain, topography, and man-made structures on the signal strength.

For microcell placement and design in cellular telephone systems, the standard modeling assumption is that terrain and buildings cannot affect signal strength to a large extent. First, the terrain across a microcell has been assumed to be flat, since a microcell is typically covering only a small area. Second, the buildings within a microcell cannot affect the signal propagation to a large extent either, since the buildings are typically spaced out over a larger area than the area covered by the microcell. These assumptions have made the modeling process easier, but have resulted in errors in the modeling process. The present invention uses the terrain changes and structures within a microcell to further model the microcell more accurately.

By considering the actual path that the signal takes between transmitter and receiver, including terrain changes, building interferences, and building reflections, systems designers using the modeling tool of the present invention will construct a more accurate model of the conditions that the system must operate under. This enhanced modeling will make cellular communications systems easier to design and cheaper to place in the field.

Hardware Environment

Figure 1:
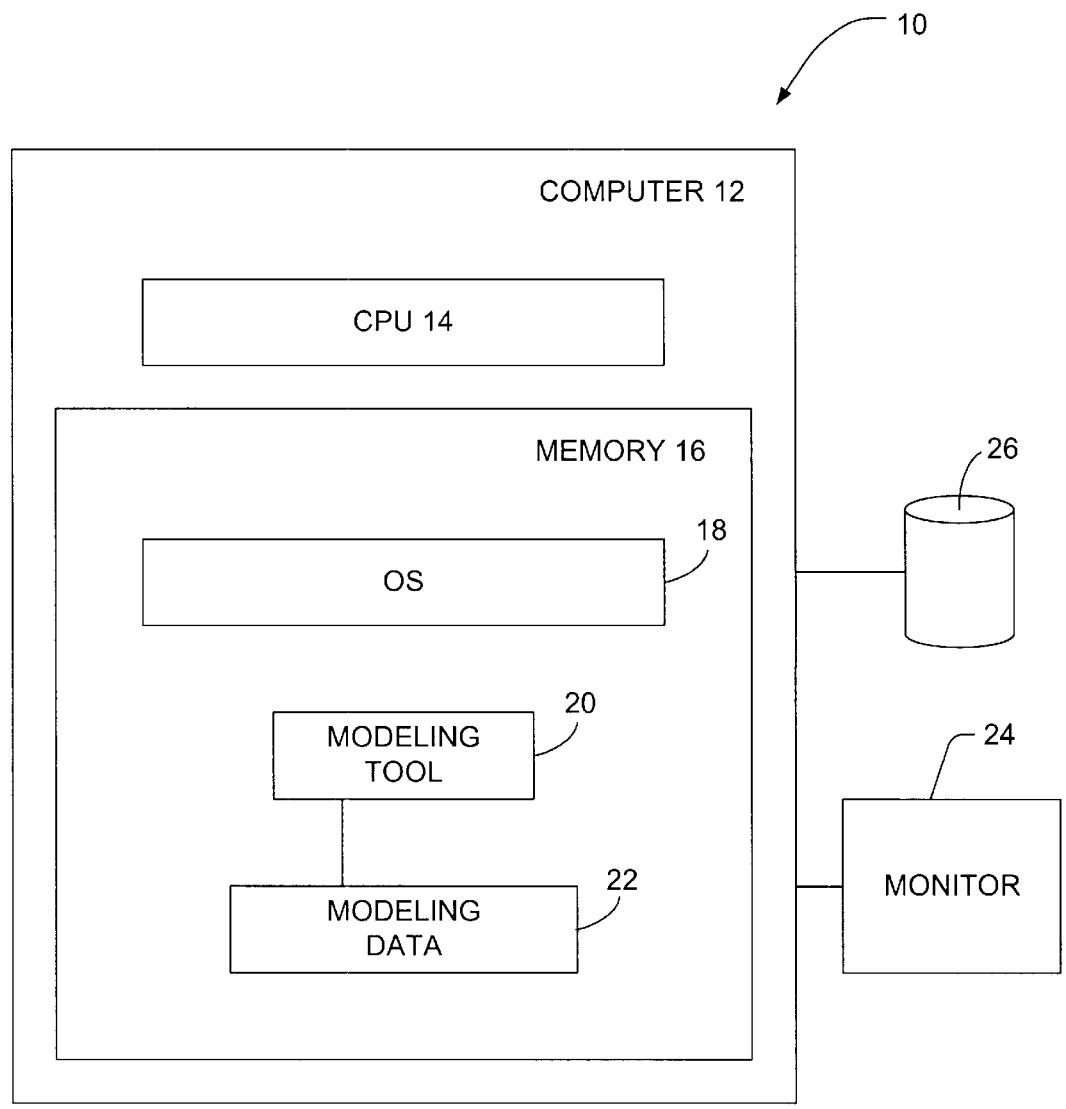
FIG. 1 illustrates an exemplary computer system that could be used to implement the present invention.

FIG. 1 illustrates an exemplary computer system 10 that could be used to implement the present invention. The computer 12 comprises a processor 14 and random access memory (RAM) 16. The computer 12 may be coupled to other devices, such as a monitor, a keyboard, a mouse device, a printer, etc. Of course, those skilled in the art will recognize that any combination of the above components, or any number of different components, peripherals, and other devices, may be used with the computer 12.

Generally, the computer 12 operates under control of an operating system 18. The present invention is preferably implemented using one or more computer programs 20 and data structures 22 operating under the control of the operating system 18. More specifically, the present invention comprises a modeling tool 20 and modeling data 22 that model a cellular telephone system, including the signal strength at points within a specified volume of space of the system, given certain constrictions and conditions within that space. The modeling tool 20 outputs the results of these operations as characters, text, and graphics on a monitor 24 or other device attached to the computer 12.

In the preferred embodiment, the operating system 18, the modeling tool 20, and the modeling data 22 are tangibly embodied in a computer-readable medium, e.g., data storage device 26, which could include one or more fixed or removable data storage devices, such as a removable cartridge drive, floppy disc drive, hard drive, CD-ROM drive, tape drive, etc. Further, the operating system 18 and the modeling tool 20 are comprised of instructions which, when read and executed by the computer 12, causes the computer 12 to perform the steps necessary to implement and/or use the present invention. Of course, those skilled in the art will recognize many modifications may be made to this configuration without departing from the scope of the present invention.

Microcells

Figure 2:
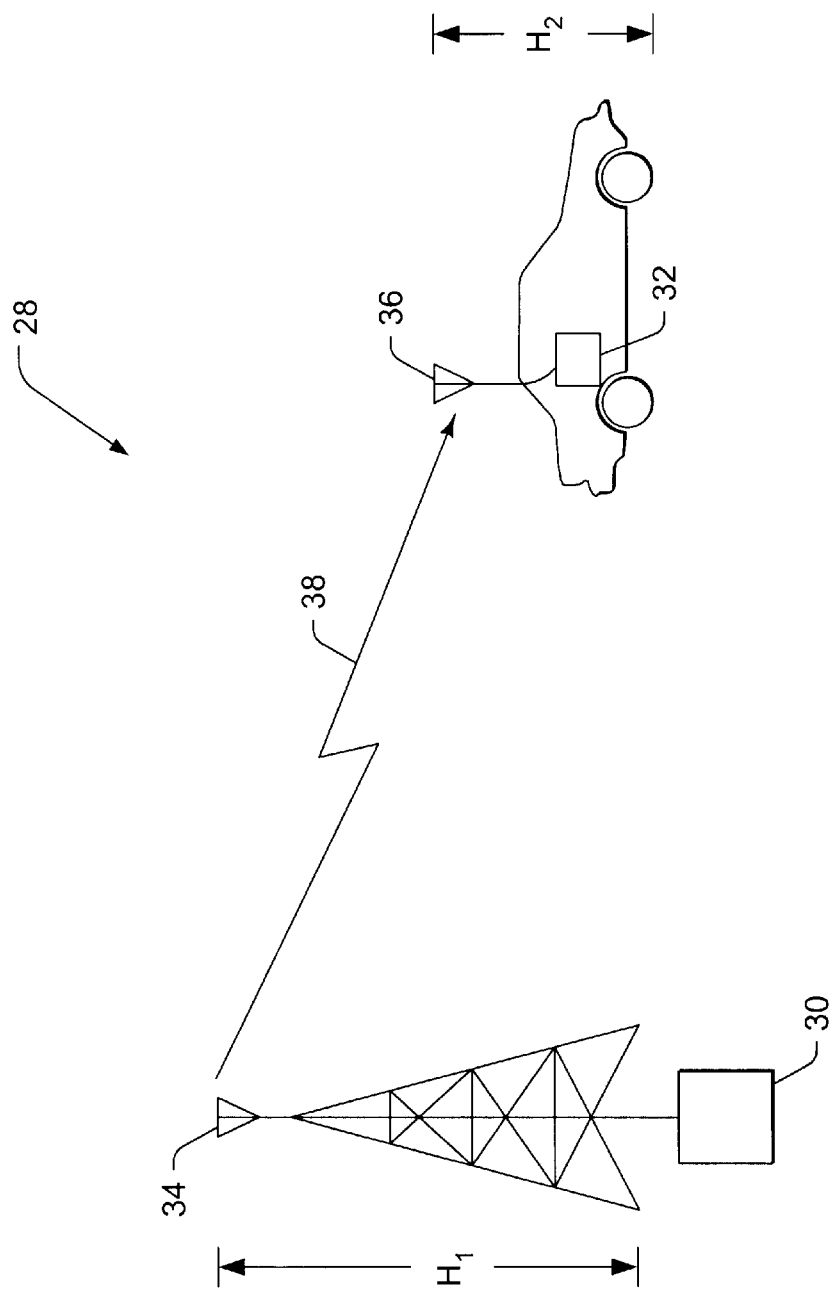
FIG. 2 is a diagram that illustrates a microcell (or other cell) in a cellular telephone system.

FIG. 2 is a diagram that illustrates a microcell (or other cell) in a cellular telephone system 28. The cellular telephone system 28 uses a transmitter 30 to transmit signals to receivers 32 (i.e., mobile cellular phones). The transmitter 30 has an antenna 34 that has an antenna gain $G_t$. The receiver 32 also has an antenna 36 with an antenna gain $G_r$. Further, the power of the transmitter 30 is $P_t$.

The transmitter antenna 34 has a height $h_1$ above the ground, and the receiver antenna 36 has a height $h_2$ above the ground. The path 38 between the transmitter antenna 34 and the receiver antenna 36 is a line of sight path in FIG. 2.

In the illustration of FIG. 2, there are no buildings or terrain changes between the transmitter antenna 34 and the receiver antenna 36. Thus, the only losses in the system 28 are the losses due to the spreading out of the power $P_t$ from the transmitter antenna 34. This loss is known as a line of sight loss or $L_{los}$.

The received signal strength at the receiver antenna 36 is given by:

$$P_r = P_t + G_t - L_{los} + G_r$$

where:

$P_r$=signal strength at receiver 32, $P_t$=transmitter 30 power, $G_t$=transmitter 30 antenna 34 gain, $L_{los}$=loss under line of sight, and $G_r$=receiver 32 antenna 36 gain.

The values $P_r$, $P_t$, $G_t$, and $G_r$ are all directly measurable quantities.

The value $L_{los}$ is computed as follows. First, the Fresnel zone is calculated for the given heights of the transmitter antenna 34 and the receiver antenna 36:

$$F_{zone} = \frac{4h_1 h_2}{\lambda}$$

where:

$F_{zone}$=Fresnel zone distance, $h_1$=height of transmitter 30 antenna 34, $h_2$=height of receiver 32 antenna 38, and $\lambda$=wavelength of transmitted signal.

If the receiver 32 antenna 36 is positioned at a distance d is within $F_{zone}$, then $L_{los}$ is given by:

$$L_{los} = 20\log\frac{4\pi d}{\lambda}$$

otherwise:

$$L_{los} = L_{bdry} - r\log\frac{d}{F_{zone}}$$

where:

$L_{bdry}$=loss at boundary of Fresnel zone, r =slope of $h_1$ to $h_2$, and d =distance from transmitter antenna 34 and receiver antenna 36.

Figure 3A:
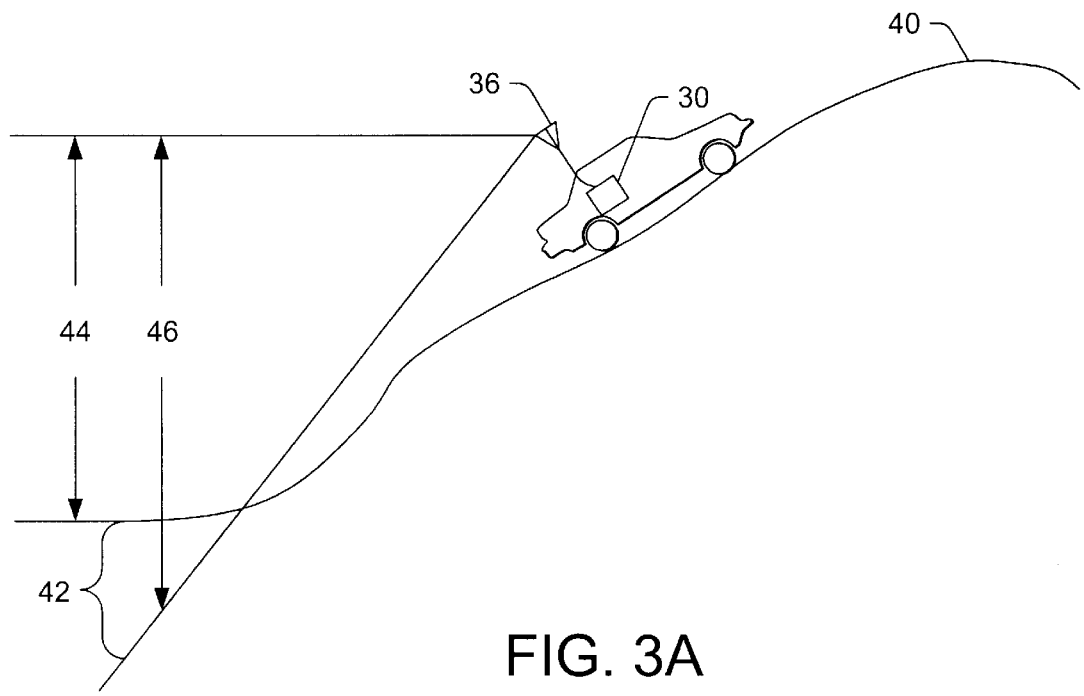
FIGS. 3A–3C are diagrams that illustrate terrain and building conditions that may be found in microcell (or other cell) in a cellular telephone system.
Figure 3B:
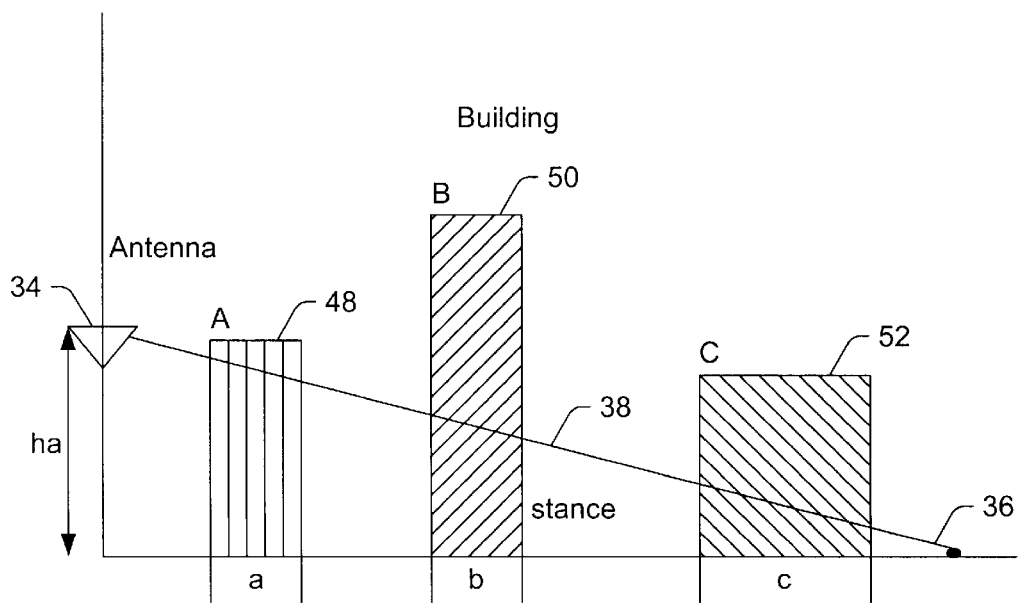
Figure 3C:
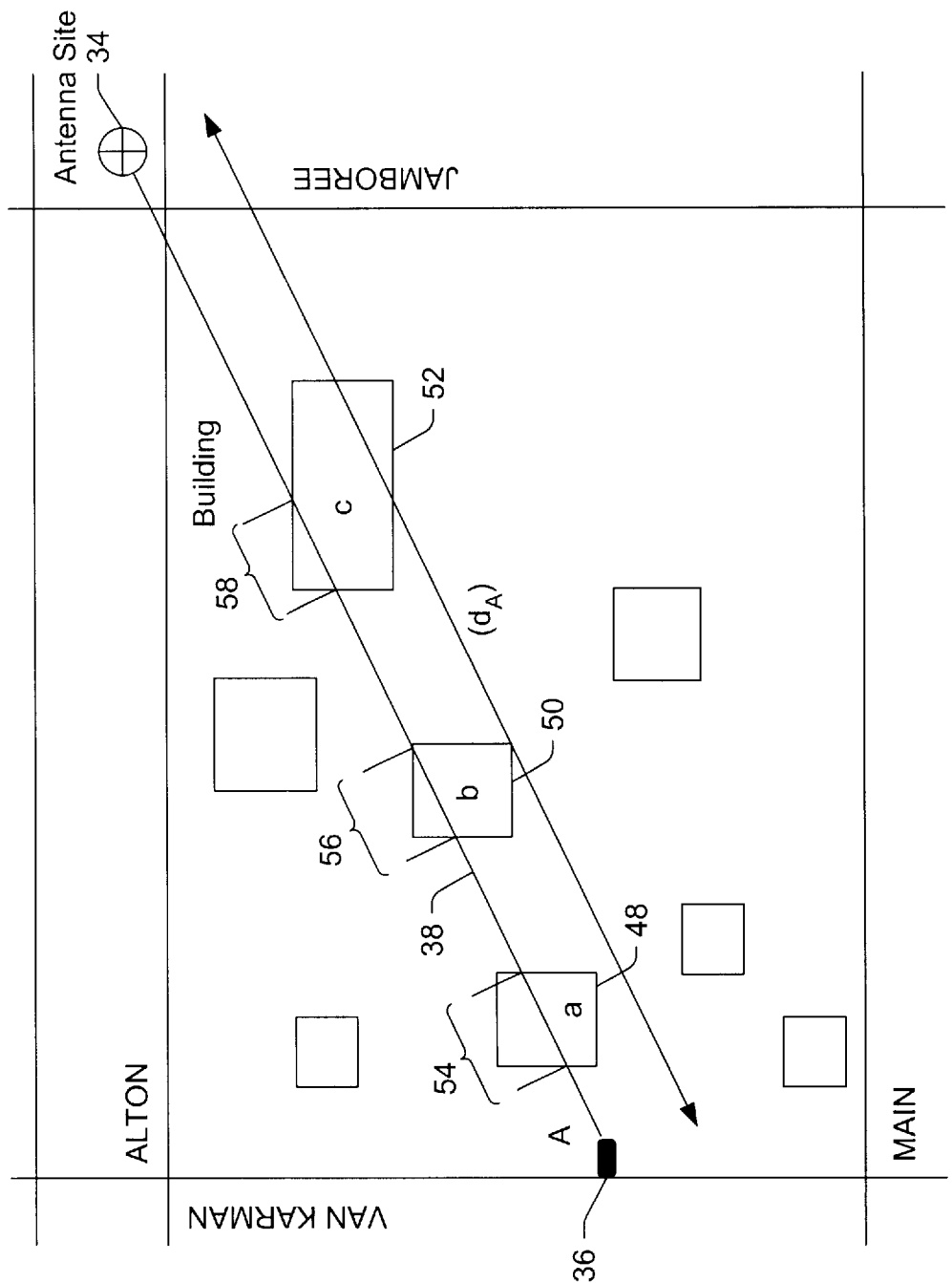

FIGS. 3A–3C are diagrams that illustrate terrain and building conditions that may be found in a cellular telephone system 28. FIG. 3A shows the receiver 32 with antenna 36 moving along terrain 40 that varies in height. In this example, terrain 40 slopes upward, but terrain 40 can take any slope. Antenna 36 has an effective antenna gain with respect to terrain 40 that is flat because a portion 42 of the antenna 36 pattern is below the terrain 40 surface. The actual height 44 of antenna 36 pattern and the effective height 46 of antenna 36 pattern affect the equation for calculating the signal strength at the receiver antenna 36, as follows:

$$P_r = P_t + G_t - L_{los} + G_r + G_{(e)}$$

The effective antenna 38 gain $G_{(e)}$, is given as:

$$G_{(e)} = 20\log\frac{h_e}{h_a}$$

where:

$h_e$=effective height 46 of antenna 36 pattern, and $h_a$=actual height 44 of antenna 36 pattern.

FIG. 3B shows that a line of sight path 38 between antenna 34 and antenna 36 may be obscured by buildings 48, 50, and 52. The signal strength at either antenna 34 or antenna 36 will be affected by the presence of buildings 48, 50, and 52 because the space losses typically associated with air are different than the space losses associated with materials other than air, e.g., building materials such as concrete, glass, etc.

FIG. 3C shows a top view of the buildings in FIG. 3B. The line of sight path 38 at antenna 36 is obscured by thickness 54 of building 48. Thus, the path 38 at point "A" will have a different cross-section or thickness 54 at point "A" than at other points within the microcell.

Similarly, line of sight path 38 at antenna 36 is obscured by thickness or cross-section 56 of building 50, and thickness or cross-section 58 of building 52. Once all of the cross-sections 54, 56, and 58 have been determined for a given point within the microcell, the total effect on the signal strength at that point contributed by the building "blockage" of path 38 is called $\alpha_\beta$ and is calculated as follows:

$$\alpha_{\beta(a+b+c)} = L_{los} - L_{bld}$$

where:

$L_{los}$=loss under line of sight, $L_{bld}$=loss due to building blockage, and a,b,c=are buildings 48, 50, and 52.

By breaking up the effects of the terrain 40 and the buildings 48, 50, and 52 into separate components of the line of sight calculations, the modeling tool 20 of the present invention is more accurate in the determination of each portion of the effect on the path 38 losses and gains. The modeling tool 20 typically uses only 2-dimensional data for the buildings 48, 50, and 52, as the thickness is the main phenomena behind the effects on the path 38. However, for more accurate predictions of the losses and gains resulting from buildings 48, 50, and 52, a consideration of the heights of the buildings 48, 50, and 52 may also be used with the modeling tool 20.

$L_{bld}$ is typically determined empirically, but can also be determined via measurement techniques. For example, the line-of-sight losses can be calculated, and any further losses measured at points within the cell can be ascribed to the building blockage in the modeling tool 20.

Figure 4:
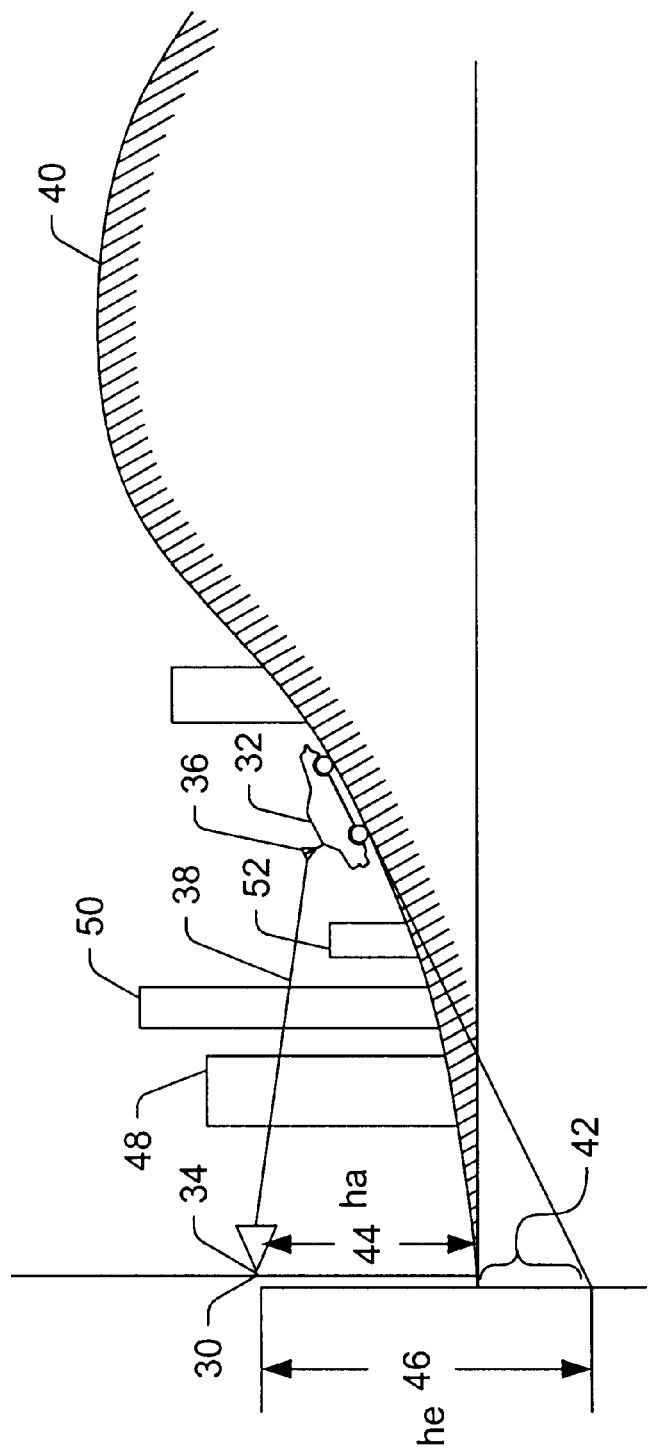
FIG. 4 is a diagram that illustrates line of sight conditions that may be found in an urban-based microcell (or other cell) in a cellular telephone system.

FIG. 4 is a diagram that illustrates line of sight conditions that may be found in an urban-based microcell (or other cell) in a cellular telephone system 28. The receiver 32 with antenna 36 is shown on terrain 40 with buildings 48, 50, and 52 between receiver antenna 36 and transmitter antenna 34. Building 52 does not block path 38. Buildings 48 and 50 will affect the signal strength calculation along path 38.

Terrain 40 causes an increase in antenna 36 gain due to the ratio of effective height ha and actual height he.

The received signal at the receiver 32 antenna 36 considering the line of sight path 38 gain and the losses due to the building 48 and 50 thicknesses blocking path 38 is:

$$P_r = P_t + G_t - L_{los} + G_r + G_{(e)} - L_{bld}$$

where:

$P_r$=signal strength at receiver 32, $P_t$=transmitter 30 power, $G_t$=transmitter 30 antenna 34 gain, $L_{los}$=loss under line of sight, $G_r$=receiver 32 antenna 36 gain, $G_{(e)}$=effective receiver 32 antenna 36 gain, and $L_{bld}$=loss due to building blockage.

Figure 5:
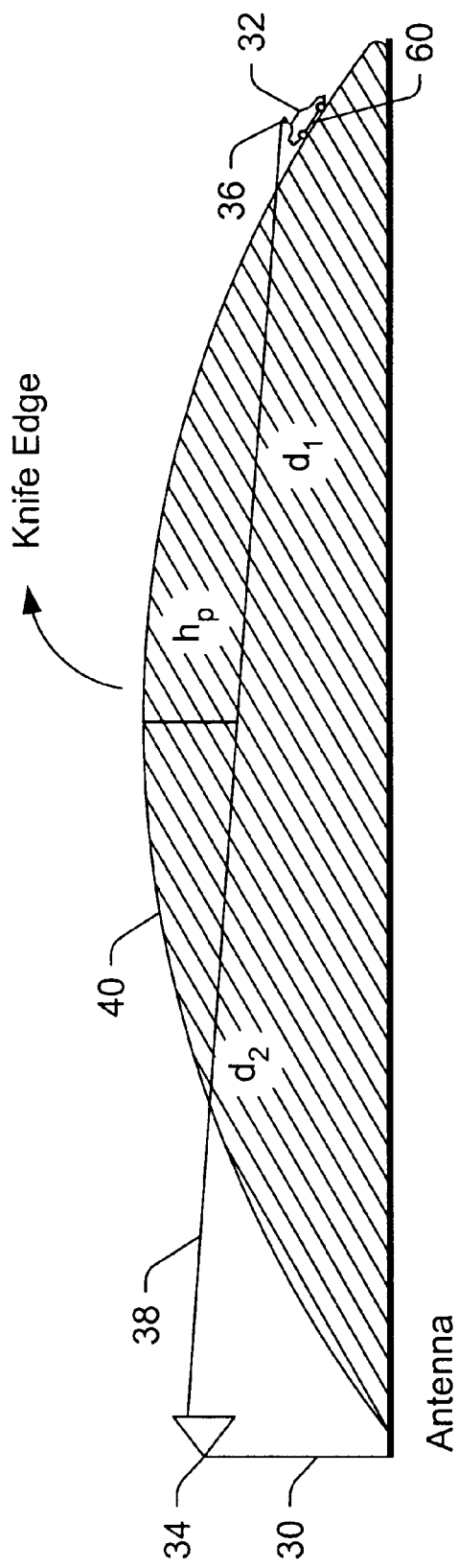
FIG. 5 is a diagram that illustrates diffraction losses that may be found in a microcell (or other cell) in a cellular telephone system.

FIG. 5 is a diagram that illustrates diffraction losses that may be found in a microcell (or other cell) in a cellular telephone system 28. As discussed with respect to FIGS. 3A–3C, terrain 40 can take any shape. As shown in FIG. 5, receiver antenna 36 is hidden or shadowed by terrain 40 from a direct line of sight path 38 to transmitter antenna 34. However, the obstruction created by terrain 40 must also be modeled to correctly predict the signal strength at the position 60 of the receiver antenna 36. The condition of the terrain 40 as shown in FIG. 5 is called a "knife edge" condition, because the height of terrain 40 that obscures path 38 is treated as a knife edge in terms of modeling the effect on the signal strength.

Because the receiver antenna 36 is in a hidden condition and is obstructed by terrain 40, there is a loss in the signal strength due to diffractions caused by the obstruction of the terrain 40. These losses are called diffraction losses. The diffraction loss, $L_{(v)}$, is calculated from a parameter v which is defined as:

$$v = -h_p[2/\lambda(1/d_1 + 1/d_2)]^{1/2}$$

where:

$h_p$=knife edge height, $\lambda$=wavelength of transmitted signal, $d_1$=distance from transmitter antenna 34 to knife edge height, and $d_2$=distance from receiver antenna 36 to knife edge height.

Thus, $L_{(v)}$ can be found from the equations or the curve against the value v as shown in W. C. Y. Lee, *Mobile Cellular Telecommunications*, 2nd Edition, McGraw-Hill Co. 1995, pages 138–139, which is herein incorporated by reference, as follows for the following values of v:

$$v \geq 1, \quad L(v) = 0 \text{ dB};$$
$$0 \leq v < 1 \quad L(v) = 20 \log(0.5 + 0.62v)$$
$$-1 \leq v < 0 \quad L(v) = 20 \log(0.5e^{0.95v})$$
$$-2.4 \leq v < -1 \quad L(v) = 20 \log\left(0.4 - \sqrt{0.1184 - (0.1v + 0.38)^2}\right)$$
$$v < -2.4 \quad L = 20 \log -\frac{0.225}{v}$$

Thus, the signal at position 60 thus takes a generalized form of:

$$P_r = P_t + G_t - L_{los} + G_r + G_{(e)} - L_{bld} - L_{(v)}$$

where:

$G_{(e)}$=gains due to terrain, and $L_{(v)}$=diffraction loss due to terrain.

Logic of the Modeling Tool

Figure 6:
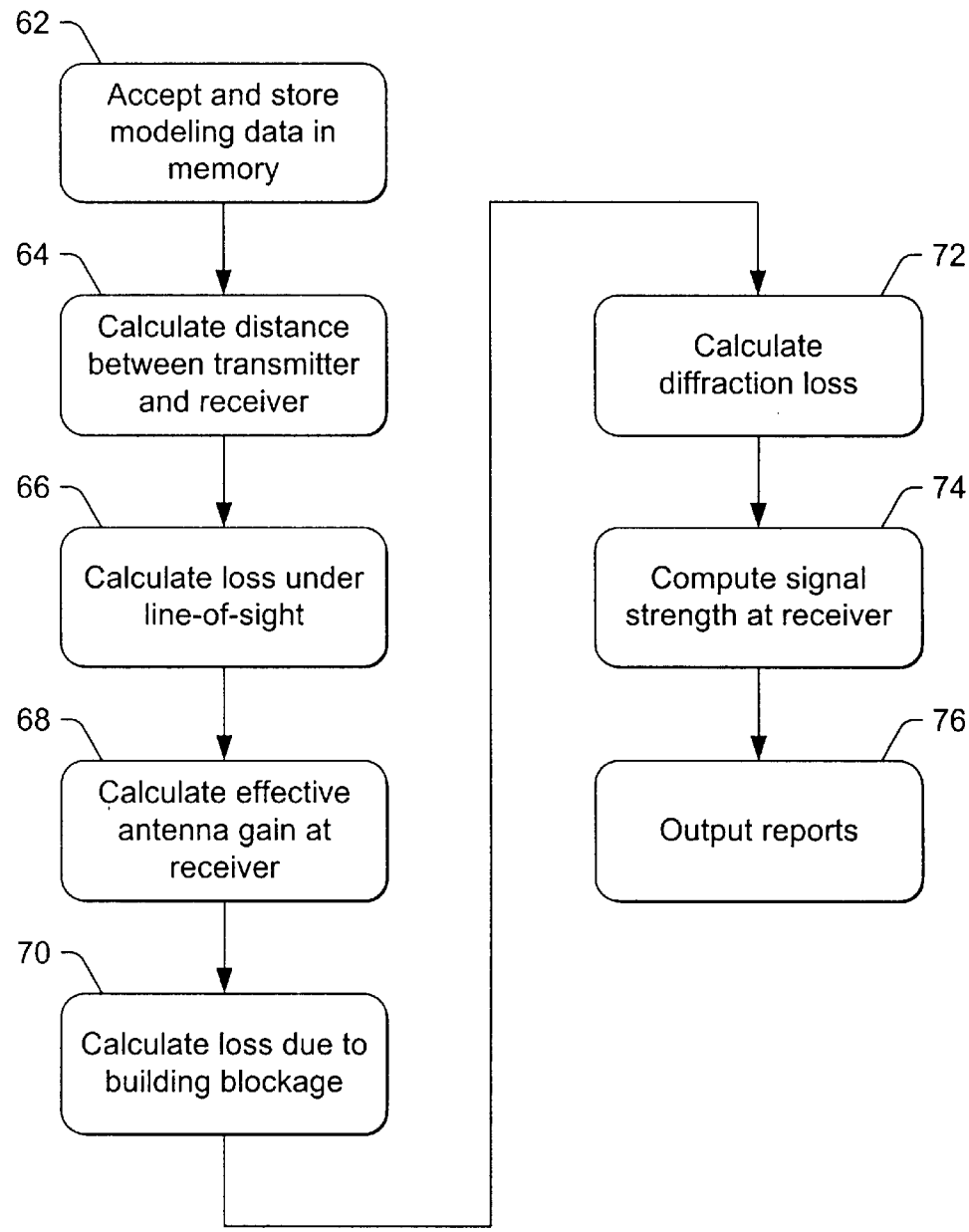
FIG. 6 is a flowchart illustrating the logic performed by the modeling tool according to the present invention.

FIG. 6 is a flow chart illustrating the logic performed by the modeling tool 20 according to the present invention.

Block 62 represents the computer 12 accepting and storing modeling data 22 in its memory 16, wherein the modeling data 22 includes the various measured values of the cellular telephone system, which are necessary to perform the computations indicated below.

Blocks 64–74 represent the computer 12 computing a strength of a signal received at the receiver antenna from the transmitter antenna using the stored data. The strength of the signal is computed by determining a line of sight signal strength between the transmitter antenna and the receiver antenna, determining effects on the signal strength from one or more obstructions between the transmitter antenna and the receiver antenna, and modifying the line of sight signal strength using the determined effects. These steps are described in more detail below.

Block 64 represents computer 12 calculating the distance between the transmitter and the receiver, and then determining the Fresnel zone of the transmitter:

$$F_{zone} = \frac{4h_1 h_2}{\lambda}$$

where:

$F_{zone}$=Fresnel zone distance, $h_1$=transmitter antenna height, $h_2$=receiver antenna height, and $\lambda$=wavelength of transmitted signal.

Block 66 represents the computer 12 calculating the loss under line of sight value, $L_{los}$. If the receiver is positioned at a distance d within $F_{zone}$, then $L_{los}$ is given by:

$$L_{los} = 20\log\frac{4\pi d}{\lambda}$$

otherwise:

$$L_{los} = L_{bdry} - r\log\frac{d}{F_{zone}}$$

where:

$L_{bdry}$=loss at boundary of Fresnel zone, r=slope of $h_1$ to $h_2$, and d=distance from transmitter antenna to receiver antenna.

Block 68 represents the computer 12 calculating the effective antenna gain, $G_{(e)}$, at the receiver as:

$$G_{(e)} = 20\log\frac{h_e}{h_a}$$

where:

$h_e$=effective height of the receiver antenna pattern, and $h_a$=actual height of the receiver antenna pattern.

Block 70 represents the computer 12 calculating the loss due to building blockage, $L_{bld}$.

Block 72 represents the computer 12 calculating the diffraction loss, $L_{(v)}$, from the parameter v which is defined as:

$$v = -h_p[2/\lambda(1/d_1 + 1/d_2)]^{1/2}$$

where:

$h_p$=knife edge height, $\lambda$=wavelength of transmitted signal, $d_1$=distance from transmitter antenna to knife edge height, and $d_2$=distance from receiver antenna to knife edge height.

Thus, $L_{(v)}$ can be found from the equations or the curve against the value v as shown in W. C. Y. Lee, *Mobile Cellular Telecommunications*, 2nd Edition, McGraw-Hill Co. 1995, pages 138–139 as follows for the following values of v:

$v \geq 1$, $\quad L(v) = 0$ dB;

$0 \leq v < 1$ $\quad L(v) = 20 \log(0.5 + 0.62v)$ $-1 \leq v < 0$ $\quad L(v) = 20 \log(0.5e^{0.95v})$ $-2.4 \leq v < -1$ $\quad L(v) = 20 \log\left(0.4 - \sqrt{0.1184 - (0.1v + 0.38)^2}\right)$ $v < -2.4$ $\quad L = 20 \log -\frac{0.225}{v}$ Block 74 represents the computer 12 computing a signal strength at the receiver antenna as:

$$P_r = P_t + G_t - L_{los} + G_r + G_{(e)} - L_{bld} - L_{(v)}$$

where:

$P_r$=signal strength at receiver antenna, $P_t$=transmitter power, $G_t$=transmitter antenna gain, $L_{los}$=loss under line of sight, $G_r$=receiver antenna gain, $G_{(e)}$=gain due to terrain, $L_{bld}$=loss due to building blockage, and $L_{(v)}$=diffraction loss due to terrain.

The values $P_r$, $P_t$, $G_t$, and $G_r$ are all directly measurable quantities of the cellular telephone system that are entered into the computer 12 and stored as the modeling data 22. The remaining values $L_{los}$, $G_{(e)}$, $L_{bld}$, and $L_{(v)}$ are computed, as indicated in Blocks 64–72, from directly measurable values of the cellular telephone system that are entered into the computer 12 and stored as the modeling data 22.

Finally, block 76 represents the computer 12 outputting one or more reports as represented in FIGS. 7, 8, 9, and 10. These reports are then used in the practical application of constructing cells for a cellular telephone system, or for optimizing cells already present in a cellular telephone system.

Output of the Modeling Tool

Figure 7:
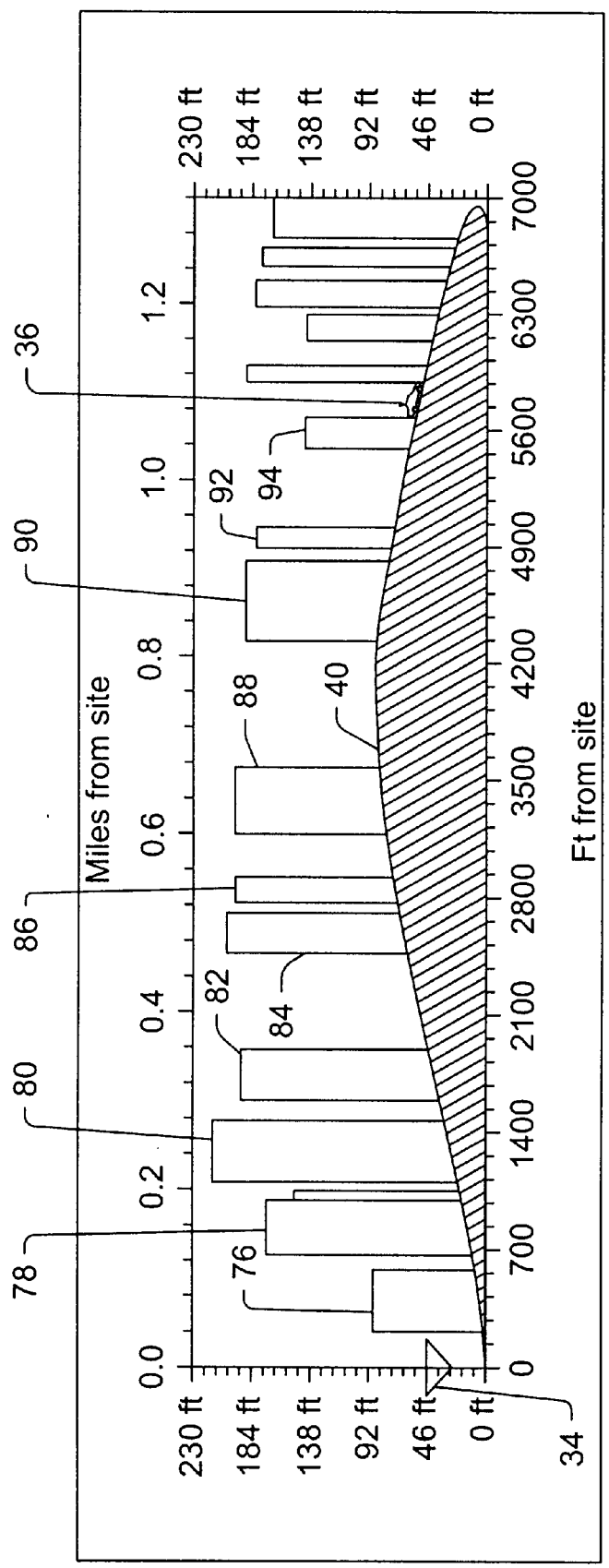
FIG. 7 is a first diagram that illustrates the output of the modeling tool according to the present invention.

FIG. 7 is a first diagram that illustrates the output of the modeling tool 20 according to the present invention. In this diagram, transmitter 30 antenna 34 and receiver 32 antenna 36 are shown located on terrain 40 with buildings 76, 78, 80, 82, 84, 86, 88, 90, 92, and 94 in between antenna 34 and antenna 36. Buildings 76–94 are shown to block the line of sight 34 between antenna 34 and antenna 36.

The respective heights of buildings 76–94 in between antenna 34 and antenna 36, as well as the heights of antennas 36 and 38 are shown in FIG. 7, along with the distance between antenna 34 and buildings 76–94, and antenna 36.

Figure 8:
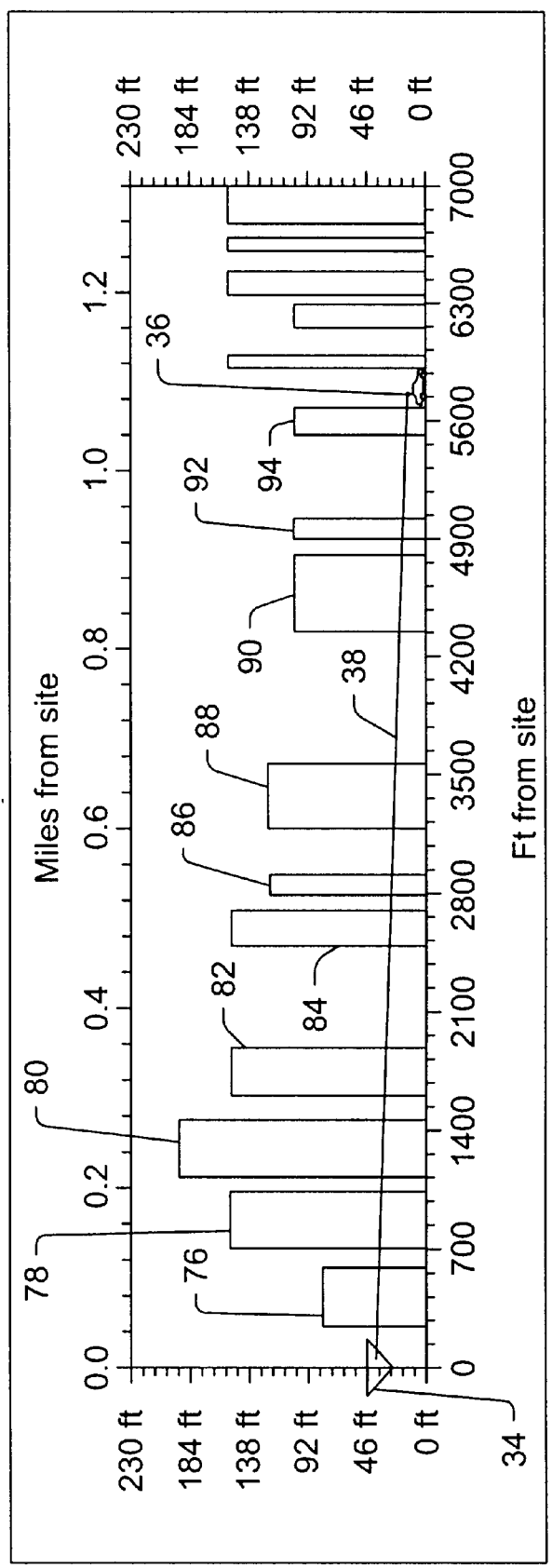
FIG. 8 is a second diagram that illustrates the output of the modeling tool according to the present invention.

FIG. 8 is a second diagram that illustrates the output of the modeling tool 20 according to the present invention. This diagram shows the effect on the line of sight path 38 due to buildings 76–94, which is computed by the present invention as described in relation to FIGS. 3A through 3C.

If $L_{los}$ is the loss of the direct wave reaching the receiver or mobile unit M due to the transmitter of power $P_{erp}$, as of now considering only the building blockage, the received signal at mobile unit M would be:

$$P_r = P_{erp} - L_{los(\text{at antenna } 36)} - L_{bld(72-86)}$$

Figure 9:
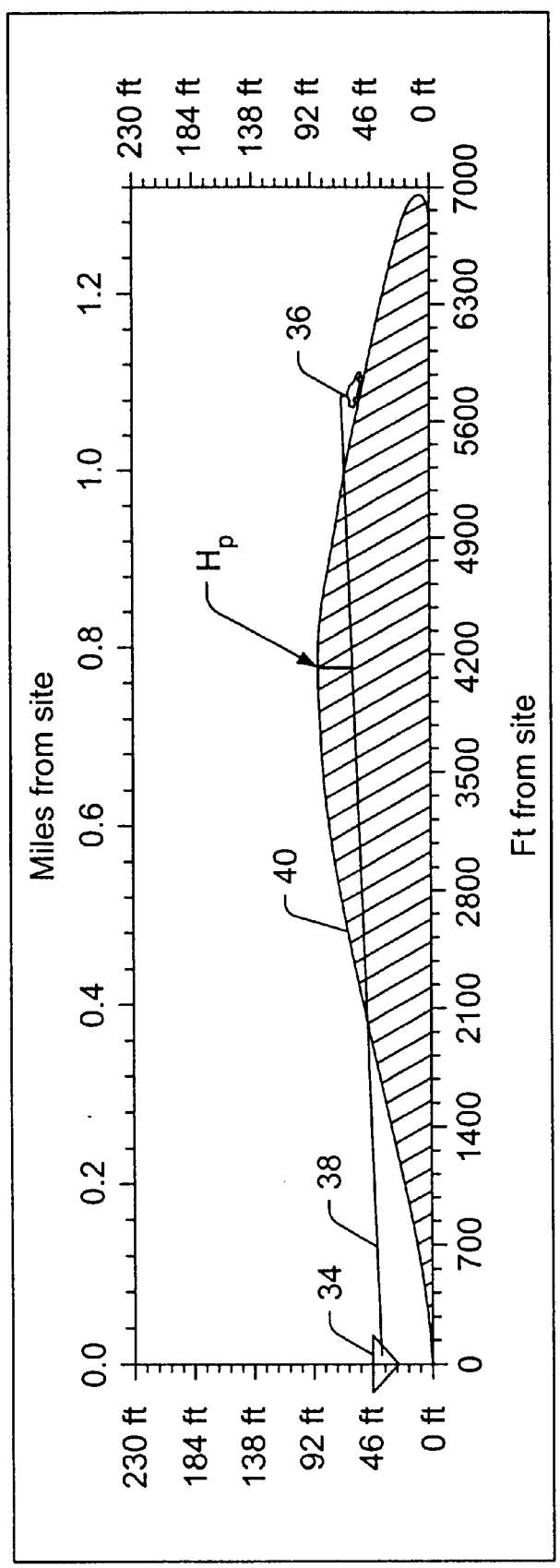
FIG. 9 is a third diagram that illustrates the output of the modeling tool according to the present invention.

FIG. 9 is a third diagram that illustrates the output of the modeling tool 20 according to the present invention. This diagram shows the effect of terrain 40 contour changes along the path 38 from the transmitter 30 antenna 34 to the receiver 32 antenna 36. The knife edge height $h_p$ is calculated using topographical information and the corresponding diffraction loss due to the knife edge $h_p$ is calculated and labeled $L_{(v)}$.

Figure 10:
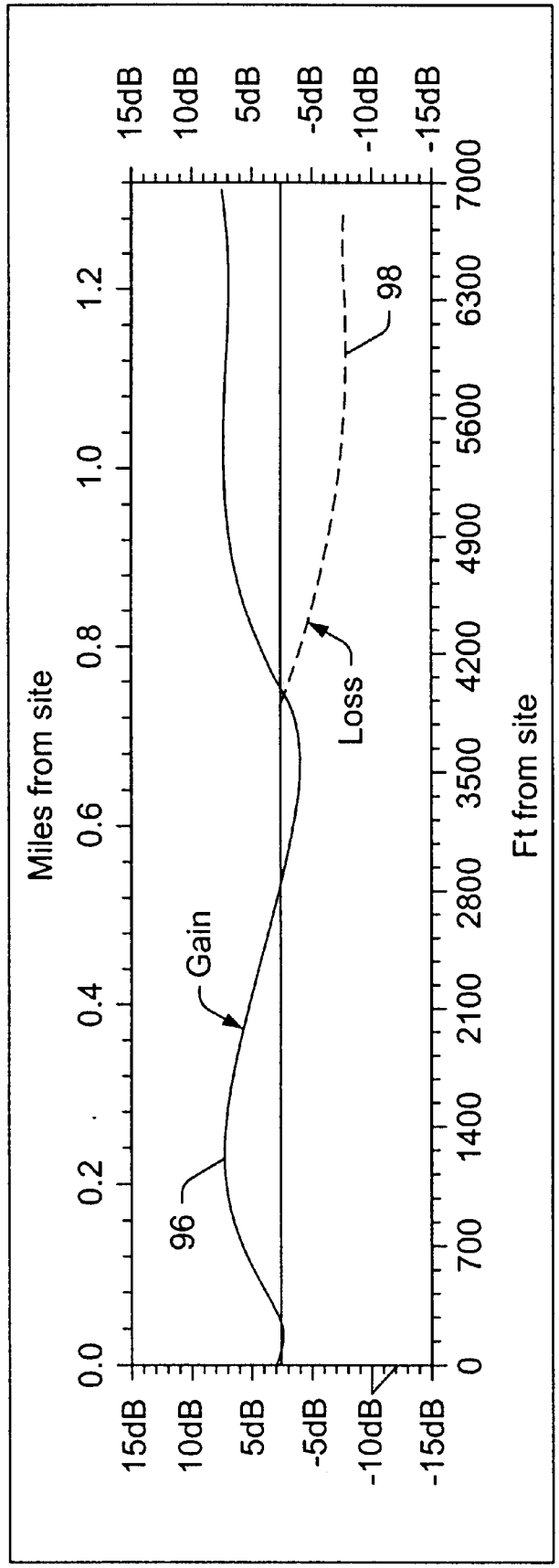
FIG. 10 is a fourth diagram that illustrates the output of the modeling tool according to the present invention.

FIG. 10 is a fourth diagram that illustrates the output of the modeling tool 20 according to the present invention This diagram shows the signal strength along the path 38 once the effect of the buildings 76–94 and the terrain 40 are calculated. This signal strength is a function of distance from the transmitter 30 antenna 34 and the terrain 40 and obstructions between the transmitter antenna 34 and receiver 32 antenna 36. The gain curve 96 is a result of the terrain 40 and building 76–94 additions to the antennas 34 and 36 gains, as well as Fresnel zone criteria adding to the overall gain of the cellular telephone system. The loss curve 98 is the result of cumulative building 76–94 losses and diffraction losses due to the terrain 40.

The received signal at receiver 32 antenna 36 is:

$$P_r = P_{erp} - L_{los\ at\ antenna\ 36} - L_{bld(70-86)} - L_{(v)}$$

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description.

What is claimed is:

1. A computer-implemented method for modeling a wireless communications system comprising a transmitter having an antenna and a receiver having an antenna located at a distant location from the transmitter antenna, comprising the steps of:

(a) collecting data concerning the operation of the transmitter and receiver, and storing the collected data in a computer, wherein the data represents: a transmitter power ($P_t$), a transmitter antenna gain ($G_t$), and a receiver antenna gain ($G_r$);

(b) computing a strength of a signal received at the receiver antenna from the transmitter antenna using the stored data, wherein the strength of the signal is computed by determining a line of sight signal strength between the transmitter antenna and the receiver antenna, determining effects on the signal strength from one or more obstructions between the transmitter antenna and the receiver antenna, and modifying the line of sight signal strength using the determined effects; and (c) outputting one or more reports from the computer representing the modified line of sight signal strength, wherein the reports are used in operating the wireless communications system.

2. The method of claim 1, wherein the computing step further comprises the step of computing a strength $P_r$ of a signal received at the receiver antenna from the transmitter antenna using the stored data, wherein the strength $P_r$ is computed as:

$$P_r = P_t + G_t - L_{los} + G_r + G_{(e)} - L_{bld} - L_{(v)}$$

where:

$P_r$=signal strength at the receiver antenna, $P_t$=transmitter power, $G_t$=transmitter antenna gain, $L_{los}$=loss under line of sight, $G_r$=receiver antenna gain, $G_{(e)}$=gain due to terrain, $L_{bld}$=loss due to building blockage, and $L_{(v)}$=diffraction loss due to terrain.

3. The method of claim 2, wherein the computing step further comprises the steps of:

(1) calculating a distance d between the transmitter antenna and the receiver antenna;

(2) determining a Fresnel zone $F_{zone}$ of the transmitter antenna as:

$$F_{zone} = \frac{4h_1 h_2}{\lambda}$$

where $h_1$ is the transmitter antenna's height, $h_2$ is the receiver antenna's height, and $\lambda$ is a wavelength for the signal transmitted by the transmitter antenna; and (3) if the receiver antenna is positioned at a distance d from the transmitter antenna that is within $F_{zone}$, then calculating $L_{los}$ as:

$$L_{los} = 20\log\frac{4\pi d}{\lambda}$$

otherwise calculating $L_{los}$ as:

$$L_{los} = L_{bdry} - r\log\frac{d}{F_{zone}}$$

where $L_{bdry}$ is a loss at a boundary of the Fresnel zone and r is a slope from $h_1$ to $h_2$.

4. The method of claim 2, wherein the computing step comprises the steps of:

(1) calculating the receiver antenna gain as:

$$G_{(e)} = 20\log\frac{h_e}{h_a}$$

where he is an effective height of the receiver antenna and ha is an actual height of the receiver antenna.

5. The method of claim 2, wherein the computing step comprises the step of:

(1) calculating the diffraction loss $L_{(v)}$ due to terrain at the receiver antenna from a parameter v defined as:

$$v = -h_p[2\lambda(1/d_11 + 1/d_2)]^{1/2}$$

where $h_p$ is a knife edge height between the transmitter and the receiver, $\lambda$ is a wavelength of the transmitted signal, $d_1$ is a distance from the transmitter antenna to the knife edge height, $d_2$ is a distance from the receiver antenna to the knife edge height, wherein when $v \geq 1$, $L_{(v)} = 0$dB, when $0 \leq v < 1$, $L_{(v)} 20\log(0.5 + 0.62v)$, when $-1 \leq v < 0$, $L_{(v)} = 20\log(0.5e^{0.95v})$, when $-2.4 \leq v < -1$, $$L_{(v)} = 20\log\left(0.4 - \sqrt{0.1184 - (0.1v + 0.38)^2}\right),$$

and when $v < -2.4$, $$L_{(v)} = 20\log - \frac{0.225}{v}.$$

6. An article of manufacture comprising a program storage medium readable by a computer having a memory, the medium tangibly embodying one or more programs of instructions executable by the computer to perform method steps for synchronizing elements of an object-oriented system, the method comprising the steps of:

(a) collecting data concerning the operation of the transmitter and receiver, and storing the collected data in a computer, wherein the data represents: a transmitter power ($P_t$), a transmitter antenna gain ($G_t$), and a receiver antenna gain ($G_r$);

(b) computing a strength of a signal received at the receiver antenna from the transmitter antenna using the stored data, wherein the strength of the signal is computed by determining a line of sight signal strength between the transmitter antenna and the receiver antenna, determining effects on the signal strength from one or more obstructions between the transmitter antenna and the receiver antenna, and modifying the line of sight signal strength using the determined effects; and (c) outputting one or more reports from the computer representing the modified line of sight signal strength, wherein the reports are used in operating the wireless communications system.

7. The article of manufacture of claim 6, wherein the computing step further comprises the step of computing a strength $P_r$ of a signal received at the receiver antenna from the transmitter antenna using the stored data, wherein the strength $P_r$ is computed as:

$$P_r = P_t + G_t - L_{los} + G_r + G_{(e)} - L_{bld} - L_{(v)}$$

where:

$P_r$=signal strength at the receiver antenna,
$P_t$=transmitter power,
$G_t$=transmitter antenna gain,
$L_{los}$=loss under line of sight,
$G_r$=receiver antenna gain,
$G_{(e)}$=gain due to terrain,
$L_{bld}$=loss due to building blockage, and
$L_{(v)}$=diffraction loss due to terrain.

8. The article of manufacture of claim 7, wherein the computing step further comprises the steps of:

(1) calculating a distance d between the transmitter antenna and the receiver antenna;

(2) determining a Fresnel zone $F_{zone}$ of the transmitter antenna as:

$$F_{zone} = \frac{4h_1 h_2}{\lambda}$$

where $h_1$ is the transmitter antenna's height, $h_2$ is the receiver antenna's height, and $\lambda$ is a wavelength for the signal transmitted by the transmitter antenna; and (3) if the receiver antenna is positioned at a distance d from the transmitter antenna that is within $F_{zone}$, then calculating $L_{los}$ as:

$$L_{los} = 20\log\frac{4\pi d}{\lambda}$$

otherwise calculating $L_{los}$ as:

$$L_{los} = L_{bdry} - r\log\frac{d}{F_{zone}}$$

where $L_{bdry}$ is a loss at a boundary of the Fresnel zone and r is a slope from $h_1$ to $h_2$.

9. The article of manufacture of claim 7, wherein the computing step comprises the steps of:

(1) calculating the receiver antenna gain as:

$$G_{(e)} = 20\log\frac{he}{ha}$$

where he is an effective height of the receiver antenna and ha is an actual height of the receiver antenna.

10. The article of manufacture of claim 7, wherein the computing step comprises the step of:

(1) calculating the diffraction loss $L_{(v)}$ due to terrain at the receiver antenna from a parameter v defined as:

$$v = -h_p[2/\lambda(1/d_1 + 1/d_2)]^{1/2}$$

where $h_p$ is a knife edge height between the transmitter and the receiver, $\lambda$ is a wavelength of the transmitted signal, $d_1$ is a distance from the transmitter antenna to the knife edge height, $d_2$ is a distance from the receiver antenna to the knife edge height, wherein when $v \geq 1$, $L_{(v)} = 0$ dB,
when $0 \leq v < 1$, $L_{(v)} = 20\log(0.5 + 0.62v)$,
when $-1 \leq v < 0$, $L_{(v)} = 20\log(0.5e^{0.95v})$,
when $-2.4 \leq v < -1$, $$L_{(v)} = 20\log\left(0.4 - \sqrt{0.1184 - (0.1v + 0.38)^2}\right),$$

and
when $v < -2.4$, $$L_{(v)} = 20\log - \frac{0.225}{v}.$$

11. A computerized apparatus for synchronizing elements of an object-oriented system, comprising:

(a) a computer having a memory;

(b) means, performed by the computer, for collecting data concerning the operation of the transmitter and receiver, and storing the collected data in a computer, wherein the data represents: a transmitter power ($P_t$), a transmitter antenna gain ($G_t$), and a receiver antenna gain ($G_r$);

(c) means, performed by the computer, for computing a strength of a signal received at the receiver antenna from the transmitter antenna using the stored data, wherein the strength of the signal is computed by determining a line of sight signal strength between the transmitter antenna and the receiver antenna, determining effects on the signal strength from one or more obstructions between the transmitter antenna and the receiver antenna, and modifying the line of sight signal strength using the determined effects; and (d) means, performed by the computer, for outputting one or more reports from the computer representing the modified line of sight signal strength, wherein the reports are used in operating the wireless communications system.

12. The apparatus of claim 11, wherein the means for computing further comprises means for computing a strength $P_r$ of a signal received at the receiver antenna from the transmitter antenna using the stored data, wherein the strength $P_r$ is computed as:

$$P_r = P_t + G_t - L_{los} + G_r + G_{(e)} - L_{bld} - L_{(v)}$$

where:

$P_r$ = signal strength at the receiver antenna,
$P_t$ = transmitter power,
$G_t$ = transmitter antenna gain,
$L_{los}$ = loss under line of sight,
$G_r$ = receiver antenna gain,
$G_{(e)}$ = gain due to terrain,
$L_{bld}$ = loss due to building blockage, and
$L_{(v)}$ = diffraction loss due to terrain.

13. The apparatus of claim 12, wherein the means for computing further comprises:

(1) means for calculating a distance d between the transmitter antenna and the receiver antenna;

(2) means for determining a Fresnel zone $F_{zone}$ of the transmitter antenna as:

$$F_{zone} = \frac{4 h_1 h_2}{\lambda}$$

where $h_1$ is the transmitter antenna's height, $h_2$ is the receiver antenna's height, and $\lambda$ is a wavelength for the signal transmitted by the transmitter antenna; and (3) if the receiver antenna is positioned at a distance d from the transmitter antenna that is within $F_{zone}$, then means for calculating $L_{los}$ as:

$$L_{los} = 20 \log \frac{4 \pi d}{\lambda}$$

otherwise means for calculating $L_{los}$ as:

$$L_{los} = L_{bdry} - r \log \frac{d}{F_{zone}}$$

where $L_{bdry}$ is a loss at a boundary of the Fresnel zone and r is a slope from $h_1$ to $h_2$.

14. The apparatus of claim 12, wherein the means for computing comprises:

(1) means for calculating the receiver antenna gain as:

$$G_{(e)} = 20 \log \frac{he}{ha}$$

where he is an effective height of the receiver antenna and ha is an actual height of the receiver antenna.

15. The apparatus of claim 12, wherein the means for computing comprises:

(1) means for calculating the diffraction loss $L_{(v)}$ due to terrain at the receiver antenna from a parameter v defined as:

$$v = -hp[2/\lambda(1/d_1 + 1/d_2)]^{1/2}$$

where h is a knife edge height between the transmitter and the receiver, $\lambda$ is a wavelength of the transmitted signal, $d_1$ is a distance from the transmitter antenna to the knife edge height, $d_2$ is a distance from the receiver antenna to the knife edge height, wherein when $v \geq 1$, $L_{(v)} = 0$ dB,
when $0 \leq v < 1$, $L_{(v)} = 20 \log (0.5 + 0.62v)$,
when $-1 \leq v < 0$, $L_{(v)} = 20 \log (0.5 e^{0.95v})$,
when $-2.4 \leq v < -1$, $$L_{(v)} = 20 \log \left( 0.4 - \sqrt{0.1184 - (0.1v + 0.38)^2} \right),$$

and when $v < -2.4$, $$L_{(v)} = 20 \log - \frac{0.225}{v}.$$

* * * * *

UNITED STATES PATENT AND TRADEMARK OFFICE
CERTIFICATE OF CORRECTION

PATENT NO.   : 6,032,105
DATED        : February 29, 2000
INVENTOR(S)  : Lee et al.

It is certified that error appears in the above-identified patent and that said Letters Patent is hereby corrected as shown below:

Column 2,
Line 65, after "invention", insert -- a --

Column 9,
Line 9, after "invention", insert a period -- . --

Column 10,
Line 15, "$(1/d_1 1 + 1/d_2)$" should read -- $(1/d_1 + 1/d_2)$ --
Line 66, "$L_{(v)} 20\log$" should read -- $L_{(v)} = 20\log$ --

Column 14,
Line 30, "$v=hp$" should read -- $v=h_p$ --
Line 31, "where h is" should read -- where $h_p$ is --

Signed and Sealed this

Sixteenth Day of April, 2002

Attest:

Attesting Officer

JAMES E. ROGAN
*Director of the United States Patent and Trademark Office*